T. M. COYLE.
PURIFIER.
APPLICATION FILED MAR. 21, 1910.

981,065.

Patented Jan. 10, 1911.

WITNESSES:
W. H. Alexander.
L. L. Mead.

INVENTOR
Thomas M. Coyle
BY
Fowler & Huffman
ATTORNEYS

UNITED STATES PATENT OFFICE.

THOMAS M. COYLE, OF ST. LOUIS, MISSOURI.

PURIFIER.

981,065. Specification of Letters Patent. Patented Jan. 10, 1911.

Application filed March 21, 1910. Serial No. 550,650.

*To all whom it may concern:*

Be it known that I, THOMAS M. COYLE, a citizen of the United States, residing at the city of St. Louis, Missouri, have invented a certain new and useful Purifier, of which the following is such a full, clear, and exact description as will enable any one skilled in the art to which it appertains to make and use the same, reference being had to the accompanying drawings, forming part of this specification.

My invention relates to a purifier for use in flour milling and has for its principal object the provision of means for preventing the air trunk of the purifier from becoming clogged.

Figure 1:
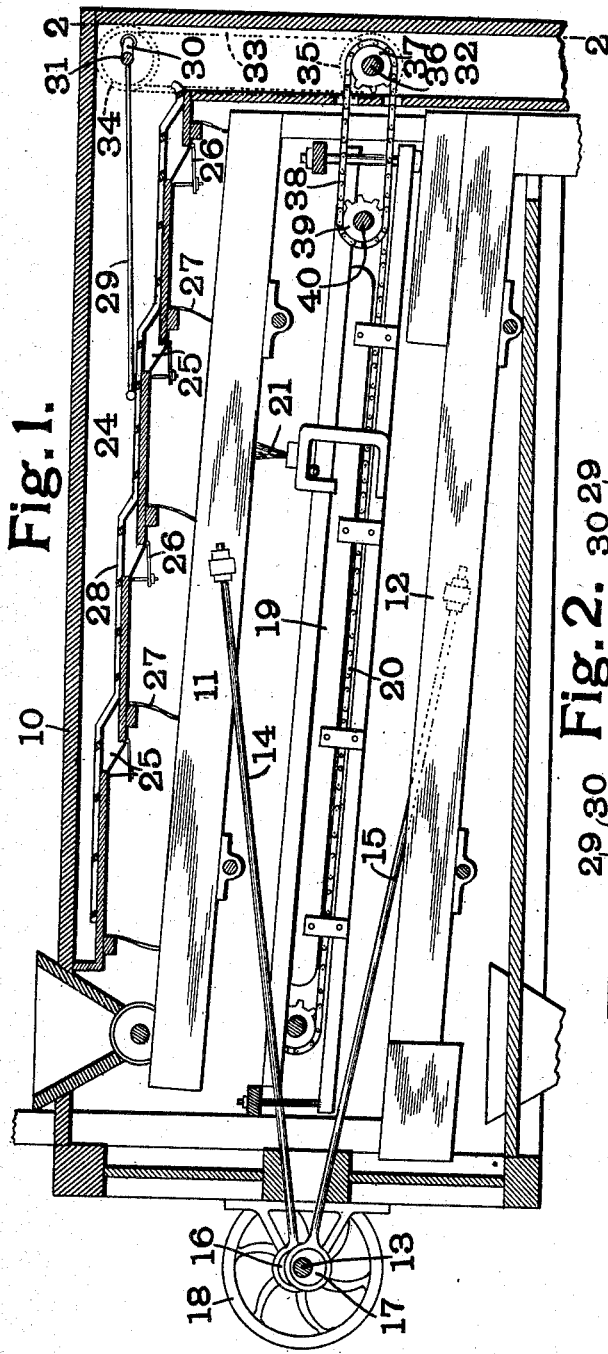
Figure 2:
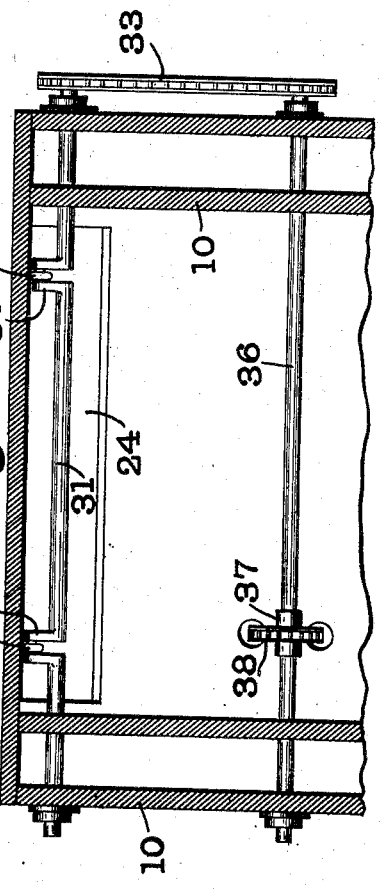

In the accompanying drawings which illustrate one form of purifier made in accordance with my invention, Figure 1 is a vertical longitudinal section and Fig. 2 is a section on the line 2—2 of Fig. 1.

Like marks of reference refer to similar parts in both views of the drawings.

10 represents the casing of the purifier. Situated within this casing 10 is a reciprocating sieve 11 and a reciprocating conveyer 12. The sieve 11 and the conveyer 12 are actuated from a shaft 13 by means of rods 14 and 15 respectively, connected with eccentrics 16 and 17 on the said shaft 13. The shaft 13 may be driven by means of a pulley 18. Arranged between the sieve 11 and the conveyer 12 is a frame 19 carrying an endless chain 20. This chain 20 actuates a reciprocating brush 21 for cleaning the lower face of the screen 11. All of the above parts may be of any usual construction.

Situated above the sieve 11 is an air-trunk 24 provided with offsets in its lower face. Each of these offsets forms an opening 25 for an inlet of air. The openings 25 are regulated by means of valves 26 so as to control the amount of air admitted to the air-trunk 24 from the sieve 11. Flexible partitions 27 extend from the lower face of the air-trunk 24 to the sieve 11. In order to prevent the clogging of the air trunk 24 I place therein a grating 28 which conforms to the lower face of the air-trunk 24. In order to reciprocate this grating 28 and thus prevent the clogging of the air-trunk I attach to the said grating connecting rods 29 the opposte ends of which are attached to cranks 30 on a crank-shaft 31. This crank-shaft 31 is preferably situated in the upper part of the air passage 32 leading from the air-trunk 24 to the exhaust fan or other device (not shown) by which the air is removed from the apparatus. The crank-shaft 31 is rotated by means of a sprocket chain 33 passing over a sprocket wheel 34 on the said shaft and over a sprocket wheel 35 upon a shaft 36. This shaft 36 is also provided with a second sprocket wheel 37 connected by means of a sprocket chain 38 with a sprocket wheel 39 upon a shaft 40 carrying one end of the endless chain 20. Whenever, therefore, the endless chain 20 is operated the movement will be communicated through the gearing above described to the grating 28 so as to reciprocate the same and prevent the clogging of the light material drawn from the sieve 11 through the air-trunk 24.

Heretofore it has been customary to provide purifiers with reciprocating air-trunks to prevent this clogging of the material drawn through the trunk. By my construction, however, the necessity for reciprocating the air-trunk is obviated and very effective means are supplied for preventing the clogging of the trunk.

Having fully described my invention, what I claim as new and desire to secure by Letters Patent of the United States, is:

1. In a purifier, the combination with a casing, of a reciprocating sieve in said casing, a stationary air-trunk above said sieve, said air-trunk having offsets in its lower face, and a grating in said air-trunk conforming to the lower face of the same.

2. In a purifier, the combination with a casing, of a reciprocating sieve in said casing, a stationary air-trunk above said sieve, said air-trunk having offsets in its lower face, a grating in said air-trunk conforming to the lower face thereof, a cleaning device for said sieve, operating means for said cleaning device, and connections between said operating means and said grating for actuating the latter.

In testimony whereof, I have hereunto set my hand and affixed my seal in the presence of the two subscribing witnesses.

THOMAS M. COYLE. [L. S.]

Witnesses:
W. A. ALEXANDER,
ELIZABETH BAILEY.